US009501768B2

(12) United States Patent
Ho et al.

(10) Patent No.: US 9,501,768 B2
(45) Date of Patent: Nov. 22, 2016

(54) SMART TICKETING IN FARE COLLECTION SYSTEMS (71) Applicant: Cubic Corporation, San Diego, CA (US)

(72) Inventors: Patrick Ho, San Diego, CA (US); Mark Fuller, San Diego, CA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 14/823,474

(22) Filed: Aug. 11, 2015

(65) Prior Publication Data

US 2016/0042333 A1    Feb. 11, 2016

Related U.S. Application Data (60) Provisional application No. 62/036,001, filed on Aug. 11, 2014.

(51) Int. Cl.
*G06K 5/00* (2006.01)
*G06Q 20/18* (2012.01)
*H04W 4/04* (2009.01)
*G06Q 20/32* (2012.01)
*G06Q 20/04* (2012.01)
*G06Q 20/00* (2012.01)
*G07B 15/04* (2006.01)
*G07C 9/00* (2006.01)

(52) U.S. Cl.
CPC ............. *G06Q 20/18* (2013.01); *G06Q 20/00* (2013.01); *G06Q 20/0453* (2013.01); *G06Q 20/3276* (2013.01); *G07B 15/04* (2013.01); *G07C 9/00166* (2013.01); *H04W 4/04* (2013.01)

(58) Field of Classification Search
CPC ............. G06K 7/0004; G06K 7/089; G06K 7/10722; G06K 7/10732; G06K 7/10831; G06K 7/10881
USPC .................................................. 235/376, 382
See application file for complete search history.

(56) References Cited

U.S. PATENT DOCUMENTS

| 8,079,515 B2 * | 12/2011 | Kocznar | E06B 11/085 |
| | | | 235/380 |
| 2012/0091202 A1 * | 4/2012 | Cohen | G06F 21/33 |
| | | | 235/382 |
| 2012/0265585 A1 | 10/2012 | Muirbrook et al. | |
| 2013/0117078 A1 | 5/2013 | Weik, III et al. | |
| 2013/0257590 A1 * | 10/2013 | Kuenzi | G05B 1/01 |
| | | | 340/5.65 |

FOREIGN PATENT DOCUMENTS

| EP | 2387007 A1 | 11/2011 |
| GB | 2501729 A | 11/2013 |

OTHER PUBLICATIONS

International Search Report and Written Opinion for PCT/US2015/044727, mailed Oct. 26, 2015, 10 pages.

* cited by examiner

*Primary Examiner* — Seung Lee
(74) *Attorney, Agent, or Firm* — Kilpatrick Townsend & Stockton LLP (57) ABSTRACT Systems and techniques are presented for processing a user through an entry location using a mobile device. User input is received indicating a request for access through the entry location. In response to receiving the user input, one or more images are captured and analyzed. A code is identified in the images based on the analysis and the code is translated to a code identifier. The code identifier uniquely identifies the code from several codes. A gate entry device is selected based on the code identifier from several gate entry devices. Further, a signal is transmitted to the gate entry device to grant access through the entry location.

19 Claims, 7 Drawing Sheets

SMART TICKETING IN FARE COLLECTION SYSTEMS

CROSS-REFERENCES TO RELATED APPLICATIONS

This application claims the benefit of U.S. Provisional Patent Application No. 62/036,001, filed Aug. 11, 2014, entitled "SMART TICKETING IN FARE COLLECTION SYSTEMS," the entire disclosure of which is hereby incorporated by reference for all purposes.

BACKGROUND

1. The Field of the Invention

The present invention generally relates to processing patrons through entry locations. More specifically, the present invention relates to ticketing and validating patrons at entry locations.

2. The Relevant Technology

A turnstile is a commonly found example of a fare gate that can be placed at entry or exit gatelines to process pedestrians through the gate. The turnstile ensures that only one pedestrian can pass through at a time. A payment device can be used in conjunction with a turnstile to automate the fee collection and access granting processes. For example, a payment device that accepts coins, tokens, tickets, or cards can be placed next to the turnstile and can operate the turnstile to grant passage only if a valid payment has been received. Turnstiles also typically include small displays to indicate feedback information, such as a success/failure message or remaining credit.

Turnstiles with payment devices and displays can be used in a wide variety of settings to restrict access to paying customers. While turnstiles are most commonly found in mass transit systems, they can also be utilized at stadiums and sporting events, amusement parks and attractions, or any other setting where payment is collected in exchange for access to a restricted area.

BRIEF SUMMARY

In one embodiment, a system for processing a user through an entry location using a mobile device is presented. The system includes an application executed by the mobile device and a computer server system. The application is configured to receive user input indicating a request for access through the entry location. An imaging device of the mobile device is activated in response to receiving the user input. The application receives image data from the imaging device and analyzes the image data. A code is identified in the image data based on analyzing the image data and the code is translated to a code identifier. The code identifier uniquely identifies the code from a plurality of codes. The code identifier and a mobile device identifier are wirelessly transmitted to the computer server system.

The computer server system is configured to receive the code identifier and the mobile device identifier. An account is identified based on the mobile device identifier and an indication of granting access through the entry location is recorded in the account. A gate entry device is selected from a plurality of gate entry devices based on the code identifier. Further, the computer server system transmits a signal to the gate entry device to grant access through the entry location.

In another embodiment, a method for processing a user through an entry location using a mobile device is presented. The method includes receiving user input indicating a request for access through the entry location. A sequence of images are captured in response to receiving the user input. The method further includes analyzing the one or more images to identify a code in each image. These codes are combined and translated to a code identifier that uniquely identifies the code from a plurality of codes. A gate entry device is selected from a plurality of gate entry devices based on the code identifier and a signal is transmitted to the gate entry device to grant access through the entry location.

In a further embodiment, a system for processing a user through an entry location using a mobile device is presented. The system includes a first application executed by a first mobile device, a computer server system and a second application executed by the second mobile device. The first application is configured to receive user input and activate an imaging device of the mobile device in response to receiving the user input. The first application receives image data from the imaging device and analyzes the image data. A code is identified in the image data based on analyzing the image data and the code is translated to a code identifier. The code identifier uniquely identifies the code from a plurality of codes. The code identifier and a mobile device identifier are wirelessly transmitted to the computer server system.

The computer server system is configured to receive the code identifier and the mobile device identifier. An account is identified based on the mobile device identifier and ticket information is retrieved for the account. The ticket information indicates a ticket for granting access through the entry location. A second mobile device is selected from a plurality of mobile devices based on the code identifier and the ticket information is transmitted to the second mobile device. The second application is configured to receive the ticket information from the computer server system and generate a notification indicating the ticket information has been received.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to implement such feature, structure, or characteristic in connection with other embodiments whether or not explicitly described.

Entry locations of areas where access is limited to certain users, such as authorized users or paying patrons, often include devices for validating the users. Fare gates, buses, building access doors and un-gated rail platforms are some but not all possible examples of entry locations. For example, a ticket validation device, such as a code scanner, can be placed at an entry location to ticket or validate a user before access is granted through the entry location. However, positioning the ticket just right for the scanner to read the code can be difficult and time consuming. Furthermore, some scanners cannot read the ticket if the ticket is being displayed on a mobile device, such as a smart phone or tablet. This is especially the case with wearable mobile devices that have smaller screens, such as smart watches and head mounted displays. As more users adopt mobile devices with smaller form factors, the problem becomes more widespread.

Embodiments described herein are directed toward using mobile devices with cameras and other sensors to process users through entry locations in an account-based system. Mobile devices can scan a QR code or read a different form of code that is posted or generated at an entry location. User account information, code data, and patrons' locations can be sent by the mobile devices to a server in the cloud. The server will verify the data and send a signal to open the gate, send a command to the originating mobile device to display entry information, and/or send a command to a second mobile device (e.g., one carried by a ticket validator) to display entry and potentially patron information. In some embodiments, the server can deduct fare from a registered payment card or prepaid fare products. The whole operation can be performed hands free with wearable mobile devices. Although examples and embodiments provided herein are described in the context of public transit systems, it is understood that embodiments are not so limited. Rather, the concepts described herein may be implemented in any environment where an entry location may be found, such as sports stadiums, music halls, movie theatres and amusement parks.

Figure 1:
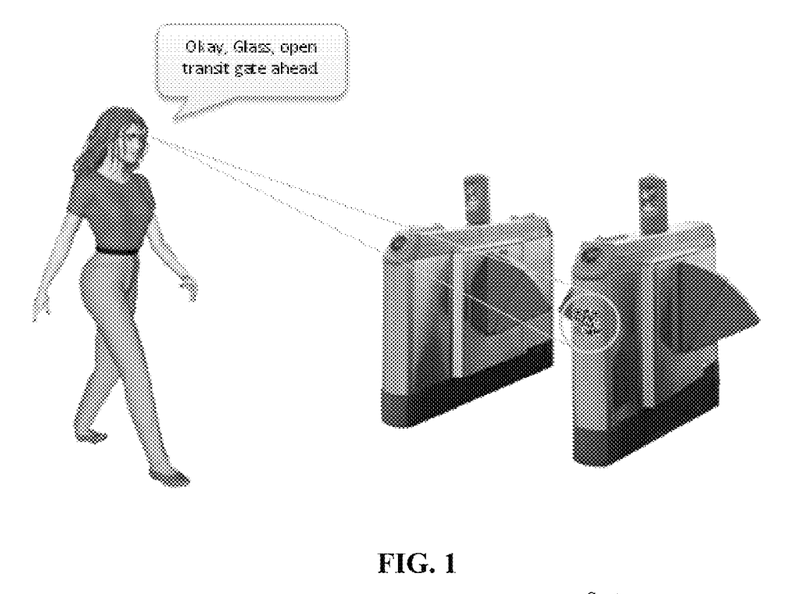
FIG. 1 is an illustration of a patron using a system for processing users through an entry location using a mobile device.

FIG. 1 is an illustration of a patron using a system for processing users through an entry location using a mobile device. In this example, the patron is using a head mounted device such as Google Glass. As the patron walks toward the entry location in a rail station, she looks at the code posted on the gate, which in this example is a quick response (QR) code, and uses a voice command to initiate a transaction. The Google Glass application scans the QR code and sends all of the necessary data, such as the user's account ID and location, to a server in the cloud. The server can verify the data, issue a command to open that gate, and deduct payment from the account. The whole operation can be hands-free.

Figure 2:
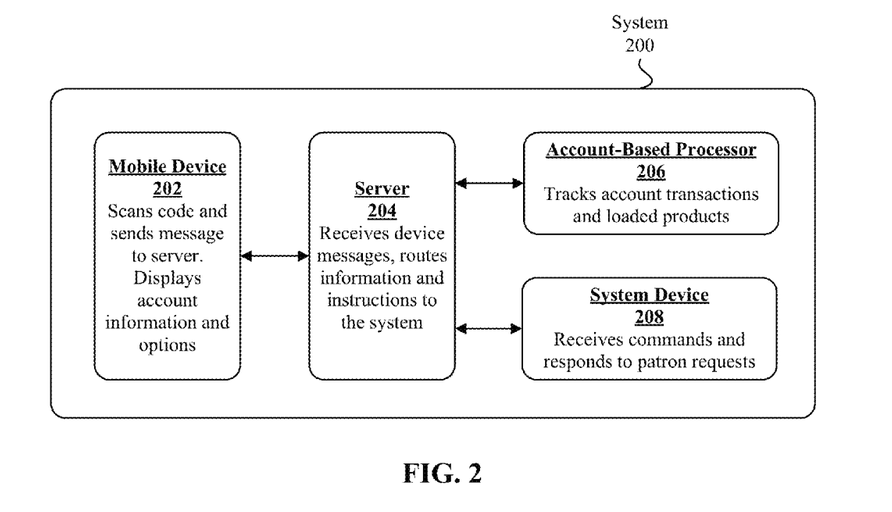
FIG. 2 is a block diagram of one embodiment of a system for processing users through an entry location using a mobile device.

FIG. 2 is a block diagram of one embodiment of a system 200 for processing users through an entry location using a mobile device. This figure illustrates an overview of system 200, while more detailed embodiments will be described below with reference to additional figures. System 200 includes a mobile device 202, a server 204, an account-based processor 206, and a system device 208. Mobile device 202 executes an application that scans and processes the code, then sends a message to server 204. The application can also display account information and provide a user interface for configuring account options. Server 204 receives messages from mobile devices and routes information and instructions between the different components of system 200. Account-based processor 206 tracks and processes transactions with accounts and loaded products, such as prepaid cards. System device 208 can be, for example, a gate entry device such as a gate paddle or a mobile device carried by a ticket inspector. System device 208 receives commands and signals, such as a signal to open the gate, from server 204 and responds to patron requests.

Figure 3:
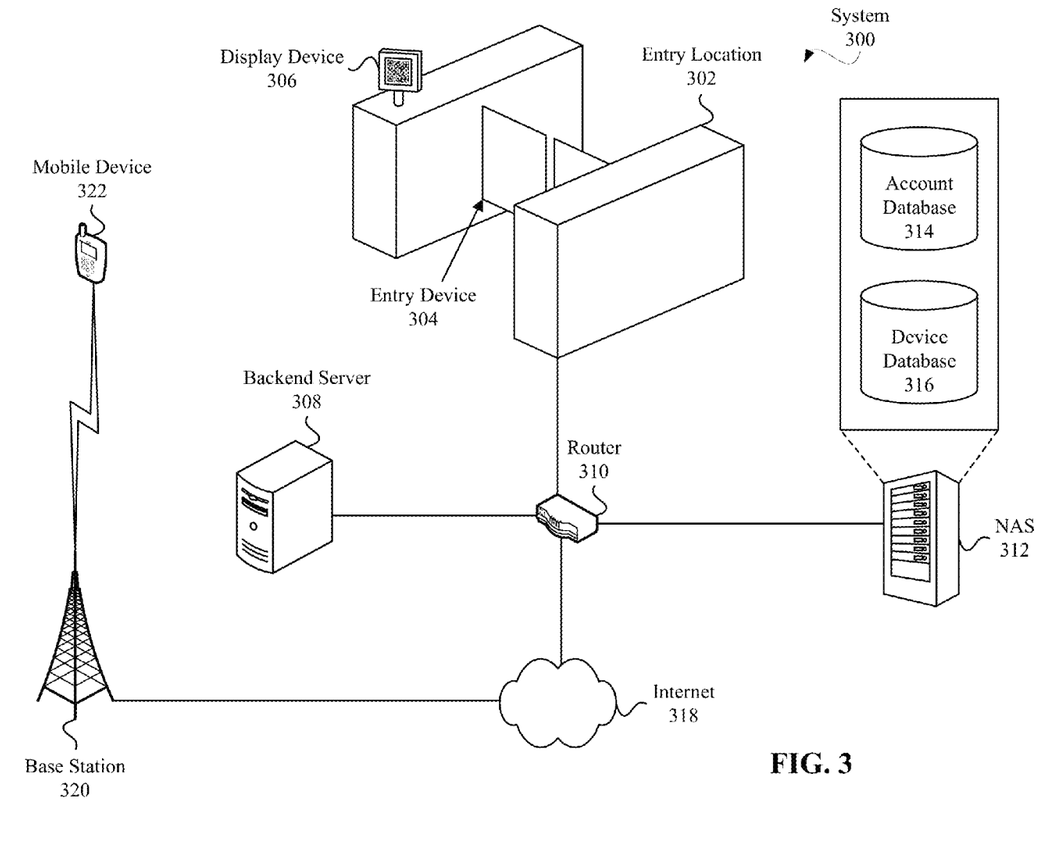
FIG. 3 is an illustration of an example embodiment of a system for processing users through an entry location using a mobile device.

FIG. 3 is an illustration of an example embodiment of a system 300 for processing users through an entry location using a mobile device. System 300 includes an entry location 302, which further includes a gate entry device 304 and a display device 306. Gate entry device 304 can be, for example, a gate paddle that performs the function of automatically granting access to a user when fare is collected. Although gate entry device 304 is illustrated as a physical paddle in this figure, it is understood that other techniques can be used to implement gate entry device 304. For example, other embodiments can grant access by generating sensory notifications, such as a visual notification generated by activating a green colored light or an audible notification (e.g., speech or sound) generated by activating a speaker.

Figure 4:
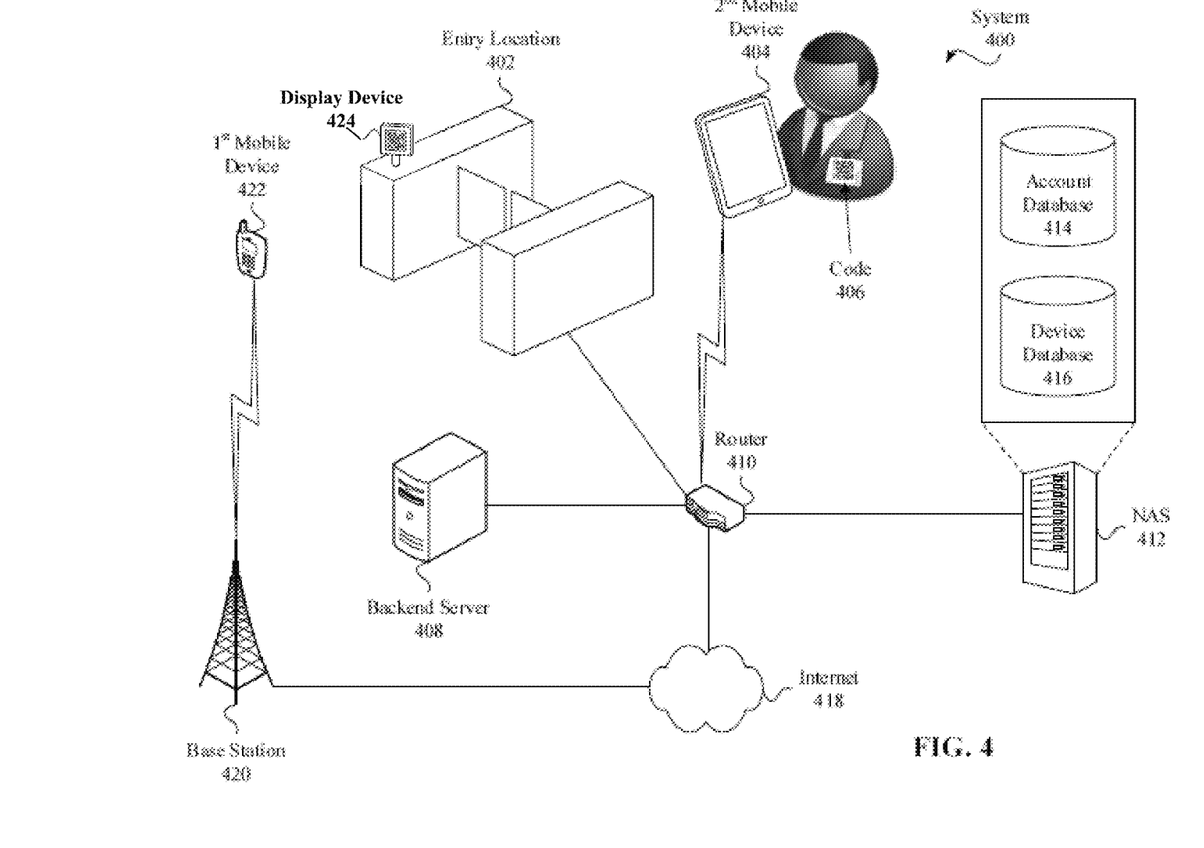
FIG. 4 is an illustration of another embodiment of a system for processing users through an entry location using a mobile device.

Display device 306 can be any electronic device that is capable of displaying an image or generating a light pattern, such as a liquid crystal display (LCD) or a light source. Display device 306 is used to display or generate a code, such as a QR code. In other embodiments, the code can be printed and posted on the gate or wall next to the gate. The code can be translated or decrypted to a code identifier, which can be associated with system devices, such as entry device 304 or a mobile device carried by a ticket inspector (as illustrated in FIG. 4). In some embodiments, the code can also include an address or link for example, to a web site or an application store page for downloading an application that can communicate with system 300. Thus, if mobile device 322 does not use the application to capture the code, it will allow mobile device 322 to download and install the application. Although a display device 306 is more costly to implement than simply posting the code, using a display device 306 allows the code to be changed periodically, which enhances the security of the system 300 by preventing users from copying and reusing the same code. While only one entry location 302 is depicted in this figure for the sake of clarity, it is understood that system 300 can include any number of entry locations 302, entry devices 304 and display devices 306.

System 300 further includes a backend server 308 that can communicate with entry device 304 and display device 306 via router 310. For example, backend server 308 can transmit signals and instructions to entry device 304 that causes entry device 304 to open or unlock.

Backend server 308 can also transmit images or signals that carry the images to display device 306 for display, or otherwise control display device 306 to generate codes. For example, if display device 306 is a light source, backend server 308 can cause display device 306 to turn on and off in a certain pattern or change color in a specific pattern to generate a code. Although backend server 308 is illustrated as a single computer, the server 308 can be implemented using any number of physical servers, processors and software modules.

Router 310 is also coupled with network attached storage (NAS) 312, which can include one or more databases. NAS 312 stores data for system 300 that is used for displaying customized information and performing other functions and features described herein. NAS 312 can be any type of storage device that is accessible over a network, including a storage area network (SAN). In other embodiments, the databases can be stored in backend server 308 rather than on a separate physical machine dedicated to data storage.

In this embodiment, NAS 312 stores an account database 314 and a device database 316. Account database 314 can be used to store information regarding accounts, such as user information including name, contact information, mobile device identifier or application identifier that can be used to identify a mobile device associated with the account, and in some embodiments, a picture of the user associated with the account. Account database 314 can also store payment information, such as a credit card, bank account or prepaid loaded products, and ticket information, such as a purchase history indicating tickets that have been purchased by the account and fare amount of each ticket. Device database 316 can be used to store information regarding devices of system 300, such as gate entry devices, display devices, ticket reader devices, fare collection devices, and mobile devices carried by operations staff. For example, device database 316 can store a table of relationships between a device identifier (e.g., media access control (MAC) address), a network address of the device, a code identifier associated with the device, the type of device, and the actions or commands that can be taken on the device.

Router 310 is further coupled to the internet 318, and backend server 308 can communicate with mobile device 322 via base station 320 and the internet 318. It is understood that the wireless connection between mobile device 322 and base station 320 is only one way of establishing communication with backend server 308. Mobile device 322 can also connect wirelessly with an access point through WiFi, for example, rather than through base station 320 using cellular protocols. Furthermore, to enhance privacy, mobile device 322 can communicate with backend server 308 through a private network rather than the internet 318. Mobile device 322 can be used to take an image or video of the code and initiate a transaction for paying fare and granting passage through the entry location 302. Although mobile device 322 is illustrated as a smart phone, it is understood that it can be implemented as any device with wireless communication capabilities and sensors that can read a code. For example, mobile device 322 can be a wearable device, such as a smart watch or head mounted display, or it can be a tablet or laptop computer.

FIG. 4 is an illustration of another embodiment of a system 400 for processing users through an entry location using a mobile device. System 400 is similar to system 300, but also includes the ability for a ticket inspector to check a status of a rider's fare using a similar code system. System 400 includes an entry location 402, which further includes a gate entry device and a display device 424 similar to those described above. Display device 424 is used to display or generate a code, such as a QR code. In other embodiments, the code can be printed and posted on the gate or wall next to the gate. The code can be translated or decrypted to a code identifier, which can be associated with system devices, such as an entry device.

System 400 further includes a backend server 408 that can communicate with entry location 402 and display device 424 via router 410. For example, backend server 408 can transmit signals and instructions to entry location 402 that causes an entry device to open or unlock. Backend server 408 can also transmit images or signals that carry the images to display device 424 for display, or otherwise control display device 424 to generate codes as described above. Although backend server 408 is illustrated as a single computer, the server 408 can be implemented using any number of physical servers, processors and software modules.

Router 410 is also coupled with network attached storage (NAS) 412, which can include one or more databases. In this embodiment, NAS 412 stores an account database 414 and a device database 416 as described above. Router 410 is further coupled to the internet 418, and backend server 408 can communicate with first mobile device 422 via base station 420 and the internet 418. First mobile device 422 can be used to take an image or video of the code and initiate a transaction for paying fare and granting passage through the entry location 402.

A second mobile device 404 may be used to quickly verify whether a patron has paid or otherwise purchased fare for access to the transit system. A ticket inspector may carry the second mobile device 404, and a code 406 may be displayed on a badge worn by the ticket inspector. The first mobile device 422 can be used by a patron to scan the code displayed on the badge. First mobile device 422 can then send a request, including account information and code information, to backend server 408. Server 408 retrieves ticket information and patron information, such as the patron's picture, from NAS 412 and sends the ticket and patron information to the second mobile device 404 that is registered to that inspector. The inspector can then verify the information on the second mobile device 404 and determine whether the patron has paid for access to the transit system.

Although entry location 402 is illustrated as a gate in this figure, it is understood that entry location 402 can also be a non-gated or attended entry location. For example, entry location 402 can be a bus entry and the ticket inspector can be the bus driver. Furthermore, in some embodiments, the ticket information and/or patron information can be sent to and displayed on the first mobile device 422 instead of or in addition to being displayed on the second mobile device 404.

Figure 5:
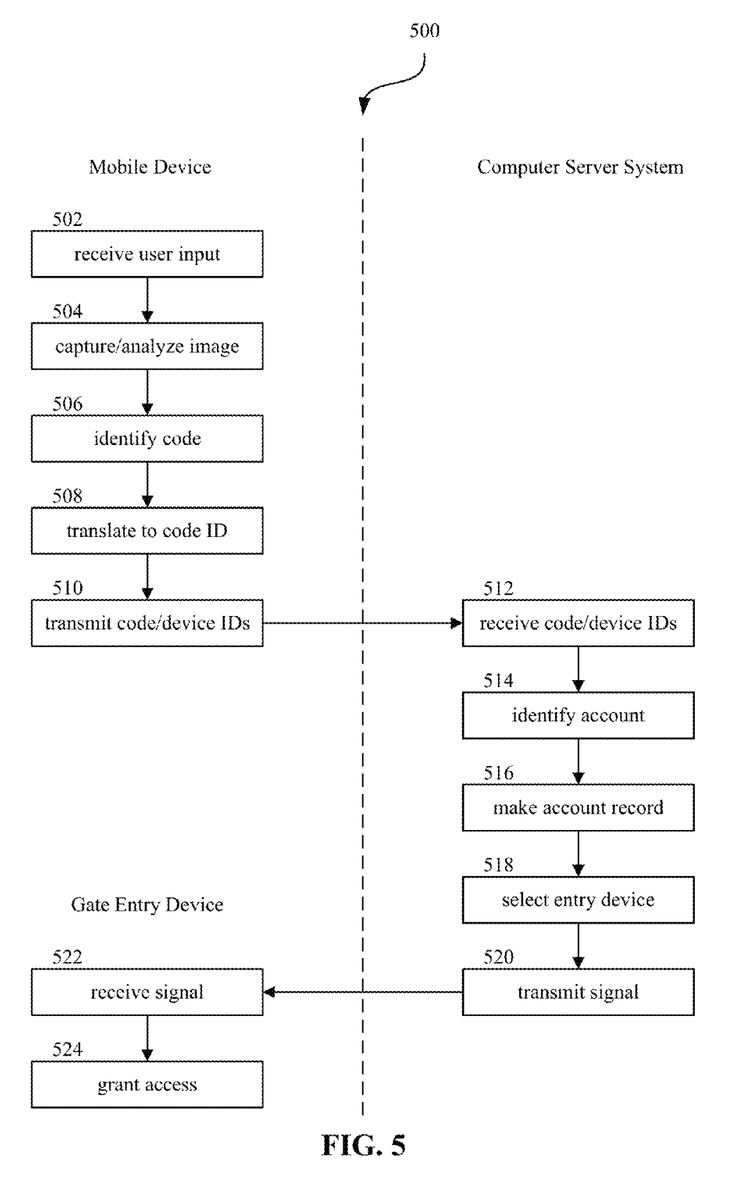
FIG. 5 is an interaction flowchart of one embodiment of a process for granting access to users through an entry location using a mobile device.

FIG. 5 is an interaction flowchart of one embodiment of a process 500 for granting access to users through an entry location using a mobile device. This figure illustrates the interactions between a mobile device, a computer server system, and a gate entry device. More specifically, the mobile device is executing an application that is performing the blocks of process 500. In this embodiment, process 500 starts at block 502, wherein the mobile device receives user input. For example, the input can be received through a button or other component of a user interface that's been pressed or otherwise activated. In some embodiments, the button or component is only enabled in the application after the user has linked the application to an account or after the user has added payment information to the account. For example, the user can provide login information, such as a username and password, or biometrical information, such as a fingerprint, to link the application to an account. The user can provide credit card information or loaded product information to add payment capabilities to the account.

In response to receiving the user input, the application captures one or more images with a camera or other imaging sensor of the mobile device and analyzes the images at block 504. Based on the analysis, a code is identified in each image at block 506 and the codes are translated to a code identifier at block 508. A code identifier can consist of any number of characters, such as numbers and letters. At block 510, the application transmits the code identifier and a device identifier to the computer server system. The device identifier can be, for example, an identifier that is defined by the application and that is unique to each mobile device, which can be stored on the mobile device, or it can be a unique identifier assigned to the mobile device by the manufacturer, such as an electronic serial number (ESN).

At block 512, the computer server system receives the code and device identifiers. Based on the device identifier, an account is identified at block 514 and a record is made in the account indicating that access was granted through the entry location at block 516. For example, the account or a payment account associated with the account can be debited for the fare amount or a previously purchased ticket in the account can be marked as having been used. The fare amount or the ticket that is used can be determined based on the code identifier, transaction date/time, and/or the user's previous transactions. At block 518, a gate entry device is selected based on the code identifier from multiple entry devices and at block 520, the computer server system transmits a signal to the selected gate entry device. For example, the computer server system can retrieve the network address of the selected gate entry device from a table or database, and transmit the signal to the network address. At block 522, the gate entry device receives the signal and, in response to receiving the signal, the gate entry device grants access at block 524. For example, the entry device can grant access by activating a green colored light or opening a gate paddle.

Figure 6:
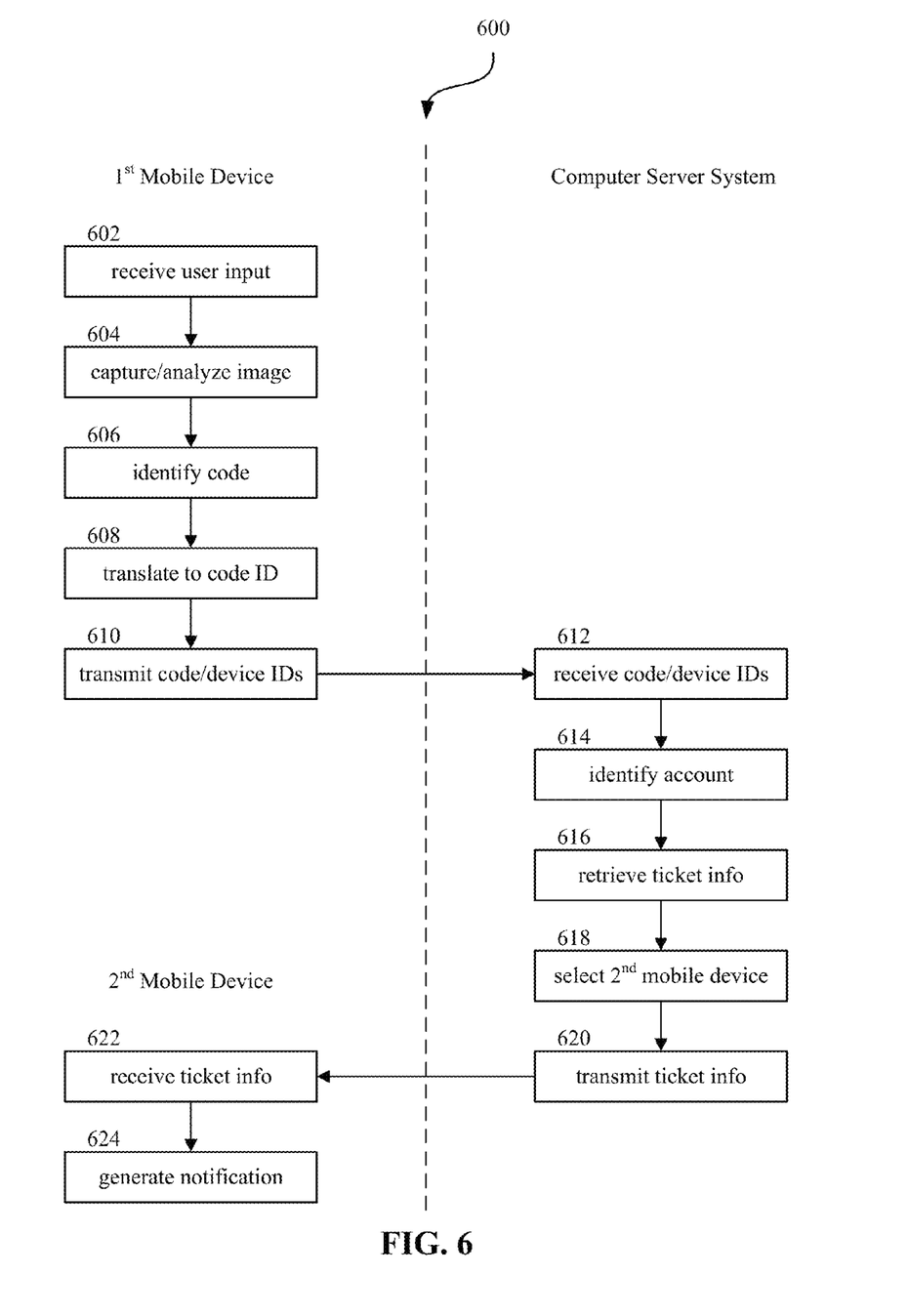
FIG. 6 is an interaction flowchart of another embodiment of a process for granting access to users through an entry location using a mobile device.

FIG. 6 is an interaction flowchart of another embodiment of a process 600 for granting access to users through an entry location using a mobile device. This figure illustrates the interactions between a first mobile device, a computer server system, and a second mobile device. For example, the first mobile device can be carried by a patron and used to purchase fare and the second mobile device can be carried by a ticket inspector to verify that the patron has purchased fare.

Process 600 is similar to process 500, except for blocks 616-624. The computer server system retrieves ticket information for the identified account at block 616. In one embodiment, the ticket can be selected from multiple tickets that have been or can be purchased on the account based on the code identifier. The ticket information can include, for example, the gate number, fare amount, patron name, patron picture, or the mobile device identifier, which can be used to verify the patron based on the device that the patron is carrying. At block 618, the second mobile device is selected based on the code identifier from multiple mobile devices and, at block 620, the computer server system transmits the ticket information to the second mobile device that was selected. For example, the computer server system can retrieve the network address of the second mobile device from a table or database, and transmit the ticket information to the network address. At block 622, the second mobile device receives the ticket information and at block 624, a notification is generated indicating that the ticket information has been received. The notification can include, for example, a visual or audible alert to notify the ticket inspector.

In some embodiments, additional features can be implemented to further assist the ticket inspector. For example, a picture of the patron can be transmitted to the second mobile device and displayed so that the ticket inspector can easily identify the patron. The picture can be displayed for a preset period of time or until the inspector identifies the patron and removes the picture using an interface component such as a button. Further, multiple pictures of patrons that have paid a valid fare can be displayed simultaneously and pictures can be grouped, for example, based on gate number, fare or travel route. If the mobile device identifier of the first mobile device is also transmitted to the second mobile device, the second mobile device can establish direct communication with the first mobile device and request the mobile device identifier from the first mobile device. The second mobile device can then compare the identifier received from the first mobile device with the identifier received from the computer server system. If the identifiers match, a notification is generated on the second mobile device to indicate to the inspector that the patron has a valid ticket.

Figure 7:
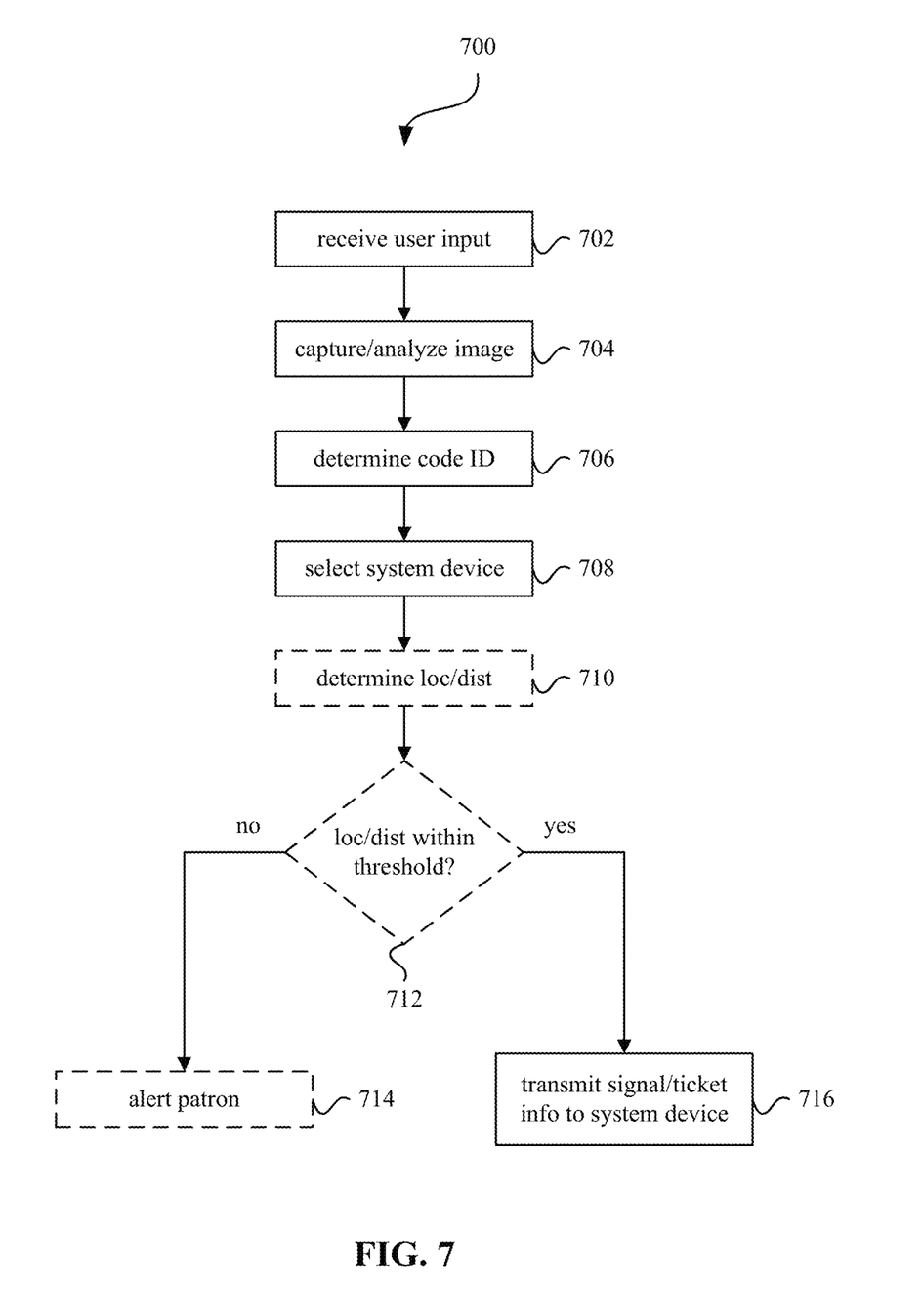
FIG. 7 is a flowchart of an example embodiment of a process for granting access to users through an entry location using a mobile device.

FIG. 7 is a flowchart of an example embodiment of a process 700 for granting access to users through an entry location using a mobile device. This embodiment illustrates optional features that can be implemented to improve security and enable additional functionality. At block 702, user input is received indicating a request for access through the gate. In response to the request, an image is captured and analyzed at block 704. A code is identified in the image based on the analysis and a code identifier is determined from the image code at block 706. A system device, such as a gate entry device or mobile device carried by a ticket inspector, is selected based on the code identifier at block 708.

Optional blocks 710-714 can be performed to ensure that the patron is at the gate to prevent misuse of the system. At block 710, the location of the patron's mobile device can be determined, for example, using a global positioning system (GPS) of the mobile device, or the distance to the entry location can be determined, for example, based on the size of the code in the captured image. The distance to the entry location can also be determined by placing beacons or other wireless signal generators at the entry location and measuring the received signal strength (RSS) of the signal that is detected by the mobile device. At block 712, a determination is made on whether the location of the mobile device is within a threshold radius of the entry location, or if the distance between the mobile device and the entry location is less than or equal a threshold distance setting. If the location and/or distance are not within threshold, the patron can be alerted at block 714 by, for example, generating a visual or audible notification. If the location and/or distance are within threshold, a signal or ticket information is transmitted to the system device at block 716.

Figure 8:
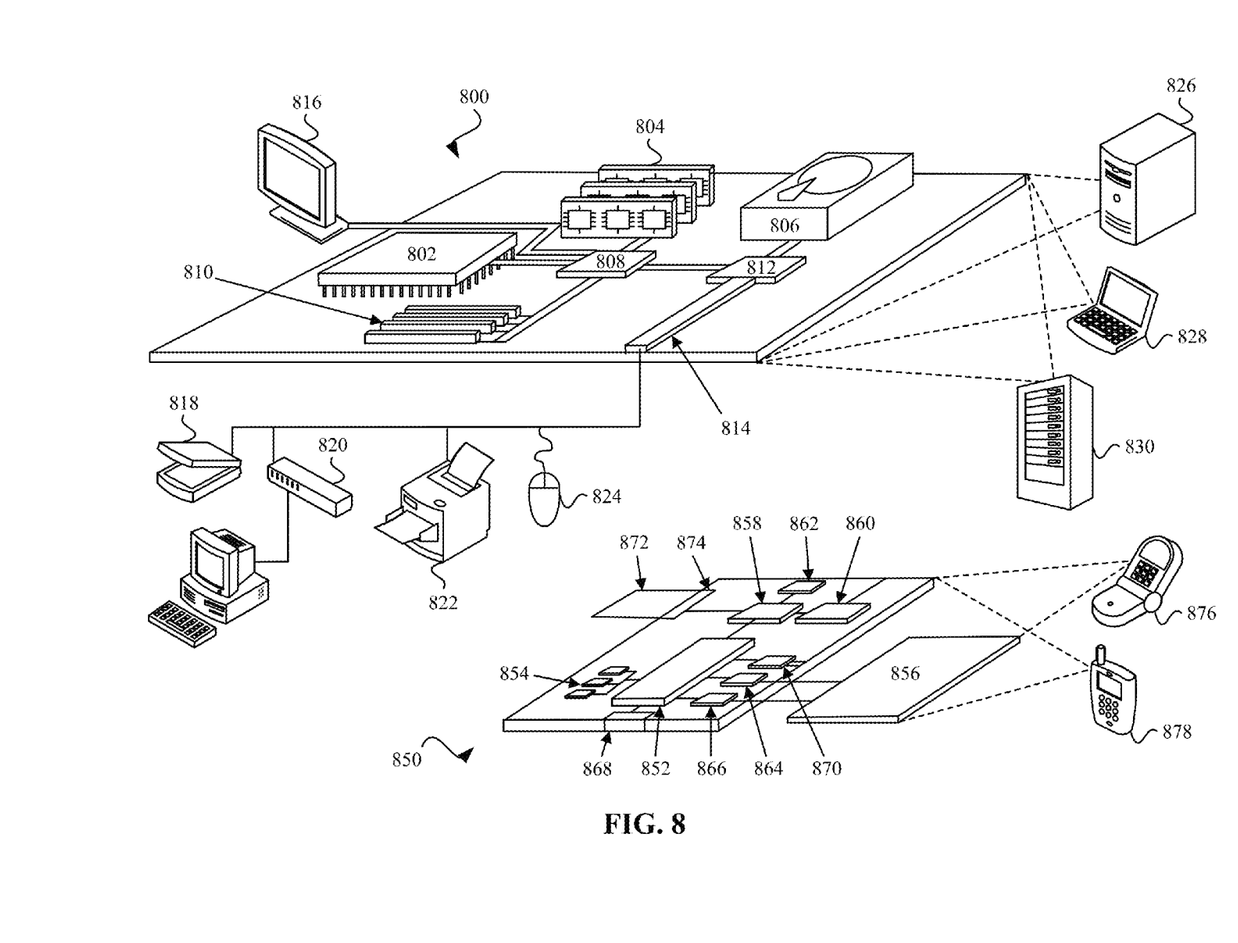
FIG. 8 is an illustration of embodiments of a special-purpose computer system and a computing device that can be used to implement a system for processing users through an entry location using a mobile device.

FIG. 8 is an illustration of embodiments of a special-purpose computer system 800 and a computing device 850 that can be used to implement a system for processing users through an entry location using a mobile device. Special-purpose computer system 800 represents various forms of digital computers, such as laptops, desktops, workstations, personal digital assistants, servers, blade servers, mainframes, and other appropriate computers. Computing device 850 represents various forms of mobile devices, such as personal digital assistants, cellular telephones, smart phones, tablets, laptops and other similar computing devices.

Computer system 800 includes a processor 802, random access memory (RAM) 804, a storage device 806, a high speed controller 808 connecting to RAM 804 and high speed expansion ports 810, and a low speed controller 812 connecting to storage device 806 and low speed expansion port 814. The components 802, 804, 806, 808, 810, 812, and 814 are interconnected using various busses, and may be mounted on a common motherboard or in other manners as appropriate. Computer system 800 can further include a number of peripheral devices, such as display 816 coupled to high speed controller 808. Additional peripheral devices can be coupled to low speed expansion port 814 and can include an optical scanner 818, a network interface 820 for networking with other computers, a printer 822, and input device 824 which can be, for example, a mouse, keyboard, track ball, or touch screen.

Processor 802 processes instructions for execution, including instructions stored in RAM 804 or on storage device 806. In other implementations, multiple processors and/or multiple busses may be used, as appropriate, along with multiple memories and types of memory. RAM 804 and storage device 806 are examples of non-transitory computer-readable media configured to store data such as a computer program product containing instructions that, when executed, cause processor 802 to perform methods and processes according to the embodiments described herein. RAM 804 and storage device 806 can be implemented as a floppy disk device, a hard disk device, an optical disk device, a tape device, a flash memory or other similar solid-state memory device, or an array of devices, including devices in a storage area network or other configurations.

High speed controller 808 manages bandwidth-intensive operations for computer system 800, while low speed controller 812 manages lower bandwidth-intensive operations. Such allocation of duties is exemplary only. In one embodiment, high speed controller 808 is coupled to memory 804, display 816 (e.g., through a graphics processor or accelerator), and to high speed expansion ports 810, which can accept various expansion cards (not shown). In the embodiment, low speed controller 812 is coupled to storage device 806 and low speed expansion port 814. Low speed expansion port 814 can include various communication ports or network interfaces, such as universal serial bus (USB), Bluetooth, Ethernet, and wireless Ethernet.

Computer system 800 can be implemented in a number of different forms. For example, it can be implemented as a standard server 826, or multiple servers in a cluster. It can also be implemented as a personal computer 828 or as part of a rack server system 830. Alternatively, components from computer system 800 can be combined with other components in a mobile device (not shown), such as device 850. Each of such devices can contain one or more of computer system 800 or computing device 850, and an entire system can be made up of multiple computer systems 800 and computing devices 850 communicating with each other.

Computing device 850 includes a processor 852, memory 854, an input/output device such as a display 856, a communication interface 858, and a transceiver 860, among other components. The components 852, 854, 856, 858, and 860 are interconnected using various busses, and several of the components may be mounted on a common motherboard or in other manners as appropriate. Computing device 850 can also include one or more sensors, such as GPS or A-GPS receiver module 862, cameras (not shown), and inertial sensors including accelerometers (not shown), gyroscopes (not shown), and/or magnetometers (not shown) configured to detect or sense motion or position of computing device 850.

Processor 852 can communicate with a user through control interface 864 and display interface 866 coupled to display 856. Display 856 can be, for example, a thin-film transistor (TFT) liquid-crystal display (LCD), an organic light-emitting diode (OLED) display, or other appropriate display technology. Display interface 866 can comprise appropriate circuitry for driving display 856 to present graphical and other information to the user. Control interface 864 can receive commands from the user and convert the commands for submission to processor 852. In addition, an external interface 868 can be in communication with processor 852 to provide near area communication with other devices. External interface 868 can be, for example, a wired communication interface, such as a dock or USB, or a wireless communication interface, such as Bluetooth or near field communication (NFC).

Device 850 can also communicate audibly with the user through audio codec 870, which can receive spoken information and convert it to digital data that can be processed by processor 852. Audio codec 870 can likewise generate audible sound for the user, such as through a speaker. Such sound can include sound from voice telephone calls, recorded sound (e.g., voice messages, music files, etc.), and sound generated by applications operating on device 850.

Expansion memory 872 can be connected to device 850 through expansion interface 874. Expansion memory 872 can provide extra storage space for device 850, which can be used to store applications or other information for device 850. Specifically, expansion memory 872 can include instructions to carry out or supplement the processes described herein. Expansion memory 872 can also be used to store secure information.

Computing device 850 can be implemented in a number of different forms. For example, it can be implemented as a cellular telephone 876, smart phone 878, personal digital assistant, tablet, laptop, or other similar mobile device.

It is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for processing a user through an entry location using a mobile device, the system comprising:
   an application executed by the mobile device, the application being configured to:
   receive user input indicating a request for access through the entry location,
   activate an imaging device of the mobile device in response to receiving the user input,
   receive image data from the imaging device,
   analyze the image data,
   identify a code in the image data based on analyzing the image data,
   translate the code to a code identifier, wherein the code identifier uniquely identifies the code from a plurality of codes, and
   transmit the code identifier and a mobile device identifier wirelessly to a computer server system; and
   the computer server system being configured to:
   receive the code identifier and the mobile device identifier,
   identify an account based on the mobile device identifier,
   record in the account an indication of granting access through the entry location,
   select a gate entry device from a plurality of gate entry devices based on the code identifier, and
   transmit a signal to the gate entry device to grant access through the entry location.

2. The system of claim 1, further comprising:
   the gate entry device being configured to activate a green colored light source in response to receiving the signal from the computer server system.

3. The system of claim 1, wherein the computer server system is further configured to retrieve a network address of the gate entry device based on the code identifier.

4. The system of claim 1, further comprising:
   a display device located at the entry location, the display device being configured to:
   display the code for a preset time period; and
   display a different code after the preset time period has elapsed.

5. The system of claim 1, wherein the computer server system is further configured to:
   determine a fare amount based on the code identifier.

6. The system of claim 1, wherein the code includes a reference to a network location for downloading the application.

7. The system of claim 1, wherein the application is further configured to:
   determine that an authorized account is associated with the application, and enable a user interface component for receiving the user input in response to determining that the authorized account is associated with the account identifier.

8. A method for processing a user through an entry location using a mobile device, the method comprising:
   receiving, at a mobile device, user input indicating a request for access through the entry location;
   capturing, using an imaging device of the mobile device, one or more images in response to receiving the user input;
   analyzing, using the mobile device, the one or more images;
   identifying, using the mobile device, a code in the one or more images based on analyzing the one or more images;
   translating, using the mobile device, the code to a code identifier, wherein the code identifier uniquely identifies the code from a plurality of codes;
   selecting, using the mobile device, a gate entry device from a plurality of gate entry devices based on the code identifier;
   determining a distance between the mobile device and the entry location;
   determining that the distance is less than or equal to a preset threshold; and
   transmitting, using the mobile device, a signal to the gate entry device to grant access through the entry location, wherein the signal is transmitted to the gate entry device based on determining that the distance is less than or equal to the preset threshold.

9. The method of claim 8, wherein the code is a quick response code.

10. The method of claim 8, wherein the user input is received via a voice user interface.

11. The method of claim 8, further comprising:
    determining a location of the mobile device, wherein the signal is transmitted to the gate entry device based on the location of the mobile device.

12. The method of claim 8, further comprising:
    determining a size of the code based on analyzing the one or more images,
    wherein the distance between the mobile device and the entry location is determined based on the size of the code.

13. The method of claim 8, further comprising:
    receiving a beacon packet from a beacon; and
    determining a received signal strength that the beacon packet was received at, wherein the distance between the mobile device and the entry location is determined based on the received signal strength.

14. A system for processing a user through an entry location using a mobile device, the system comprising:
a first application executed by a first mobile device, the first application being configured to:
receive user input,
activate an imaging device of the mobile device in response to receiving the user input,
receive image data from the imaging device,
analyze the image data,
identify a code in the image data based on analyzing the image data,
translate the code to a code identifier, wherein the code identifier uniquely identifies the code from a plurality of codes, and
transmit the code identifier and a mobile device identifier wirelessly to a computer server system;
the computer server system being configured to:
receive the code identifier and the mobile device identifier,
identify an account based on the mobile device identifier,
retrieve ticket information for the account, the ticket information indicating a ticket for granting access through the entry location,
select a second mobile device from a plurality of mobile devices based on the code identifier, and
transmit the ticket information to the second mobile device; and
a second application executed by the second mobile device, the second application being configured to:
receive the ticket information from the computer server system, and
generate a notification indicating the ticket information has been received.

15. The system of claim 14, wherein the second application is further configured to:
receive a picture of the user from the computer server system, and
display the picture of the user.

16. The system of claim 15, wherein the second application is further configured to display the picture of the user for a preset period of time.

17. The system of claim 15, wherein the second application is further configured to display a plurality of pictures of user with valid tickets simultaneously.

18. The system of claim 17, wherein the second application is further configured to group a subset of the plurality of pictures by gate in the display.

19. The system of claim 14, further comprising:
a light source configured to generate light in a pattern to generate the code.

* * * * *